United States Patent

[11] 3,558,077

[72] Inventor Hans Heinen
 Munich, Germany
[21] Appl. No. 754,566
[22] Filed Aug. 22, 1968
[45] Patented Jan. 26, 1971
[73] Assignee AGFA-Gevaert Aktiengesellschaft
 Leverkusen, Germany
[32] Priority Aug. 31, 1967
[33] Germany
[31] 1,547,068

[54] THREADING DEVICE FOR MOTION PICTURE FILM OR THE LIKE
 12 Claims, 1 Drawing Fig.
[52] U.S. Cl. ............................................. 242/192,
 352/78, 352/157
[51] Int. Cl. ....................................... G03b 1/04,
 G11b 15/32
[50] Field of Search ............................. 242/198—
 —203; 352/72—78, 157, 158

[56] References Cited
UNITED STATES PATENTS
3,386,675 6/1968 Thomsen ..................... 242/198
3,429,518 2/1969 McKee ......................... 242/192

Primary Examiner—Leonard D. Christian
Attorney—Michael S. Striker

ABSTRACT: The housing of a motion picture projector defines a film path in which the film must advance toward the gate. The film is stored on a reel which is installed in a magazine and its leading end can be fully concealed in the interior of the magazine. The housing and the magazine accommodate portions of an automatic film threading device which causes the leading end of the film to enter the film path irrespective of the position of such leading end prior to threading. The threading device comprises a guide which is installed in the magazine to bear against the outermost convolution of convoluted film and can direct the leading end into the film path when the leading end is caused to assume a predetermined angular position with reference to the axis of the reel. A drive of the threading device can rotate the reel in a sense to pay out the film and to move the leading end to predetermined position in response to operation of the film transporting mechanism. This drive comprises an endless belt which is provided with external ribs adapted to engage and to entrain the leading end if the latter happens to be located between the belt and the guide when the threading operation is started. If the leading end is already located downstream of the belt, the reel is simply rotated until the leading end reaches the guide and is caused to enter the film path so as to move into the range of a driven member in the film transporting mechanism.

PATENTED JAN 26 1971　　　　　　　　　　　　　　3,558,077
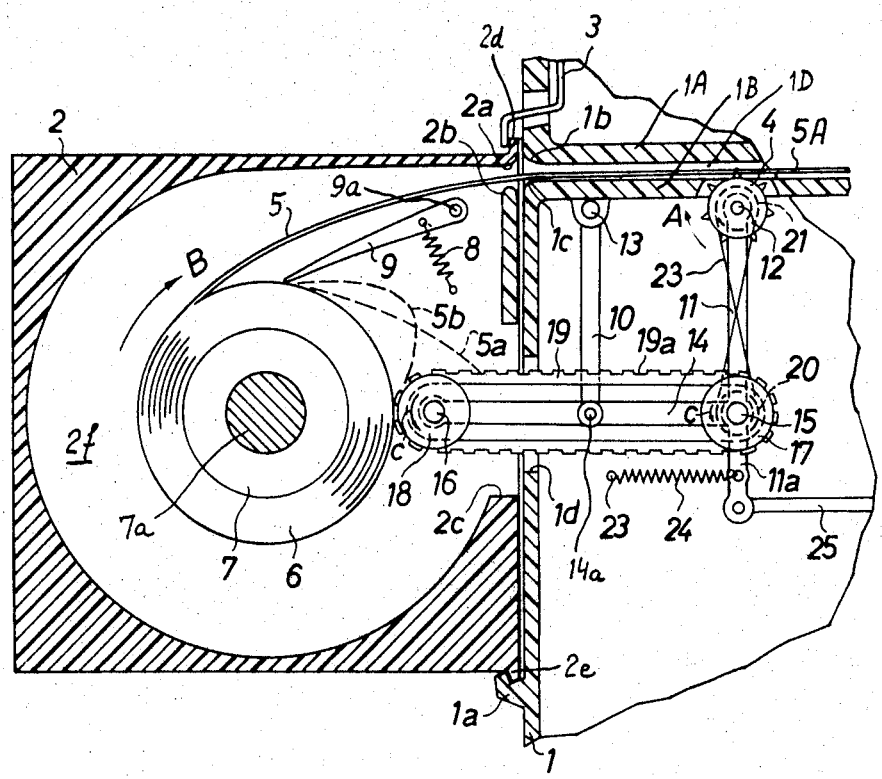
INVENTOR.
HANS HEINEN
BY Michael J. Striker

3,558,077

THREADING DEVICE FOR MOTION PICTURE FILM OR THE LIKE

BACKGROUND OF THE INVENTION

The present invention relates to cinematographic apparatus, particularly to motion picture projectors, and more particularly to an improved threading device which can thread the leading end of a motion picture film in a projector so that the leading end can be engaged by the film transporting mechanism.

Motion picture film is often stored in a magazine or cassette which can be coupled to or inserted into the housing of a motion picture projector. As a rule, the leading end of the film must extend from the magazine in order to facilitate threading of film past the sprocket or sprockets of the film transporting mechanism, through one or more loop formers, through the projection gate, and on to the takeup spool. Thus, when the film is being rewound onto the spool in the magazine upon completion of projection of images on its frames, the operator must make sure that the leading end of the film (i.e., that end which is the trailing end during rewinding) should not be permitted to enter the interior of the magazine. This is achieved by providing the leading end of the with a bead or the like which is wide enough to prevent its passage through the mouth of the magazine, or the rewinding operation is monitored and the film arrested before its leading end can enter the magazine. In each instance, the film is subjected to excessive tensional stresses, either because the reinforced leading end engages the surfaces surrounding the mouth or because the film must be brought to a sudden stop when the leading end approaches the mouth. This is undesirable, particularly because the rewinding operation is normally carried out at a high speed.

SUMMARY OF THE INVENTION

An object of my invention is to provide a cinematographic apparatus for projection of images on frames of motion picture film, which may but need not be stored in a magazine, and to provide the apparatus with means for automatically threading the leading end of the film into a predetermined film path irrespective of the angular position of such leading end prior to start of the threading operation.

Another object of the invention is to provide a cinematographic apparatus which can employ motion picture film stored in a magazine and which is equipped with a threading device capable of properly introducing the leading end of film into the film path regardless of whether or not the leading end of the film is concealed in the interior of the magazine.

A further object of the invention is to provide the threading device with a novel drive for convoluted motion picture film and to construct and assemble the drive in such a way that it can move the leading end of convoluted film to an optimum position for introduction into the film path in response to operation of the film transporting mechanism of the apparatus.

An additional object of the invention is to provide a relatively simple and inexpensive film threading device which occupies little room in and/or on the housing of a cinematographic apparatus, which comprises a small number of simple parts, which need not be provided with a separate prime mover, and which can be concealed in the interior of the housing when the apparatus is not in use.

A concomitant object of the invention is to provide a threading device which is not likely to damage or deface the film during threading and which is capable of introducing the leading end of convoluted film into the film path within a very short interval of time.

The invention is embodied in a combination which includes a cinematographic apparatus, particularly a motion picture projector, having a housing, a rotary reel carried by the housing and containing a supply of convoluted film having a leading end, confining means provided in or on the housing and defining a film path for conveying the film lengthwise in response to unwinding of film from the reel, the confining means having an inlet and one end of the film path, and a novel threading device for introducing the leading end of convoluted film into the inlet. The threading device comprises a drive for rotating the reel in a direction to unwind the film and to thereby place the leading end into a predetermined angular position with reference to the axis of the reel, and guide means for directing the leading end into the inlet in response to further rotation of the reel in such direction.

The drive preferably comprises an endless elastic belt which can derive motion from the film transporting mechanism of the apparatus and can be made to bear against the outermost convolution of the supply on the reel. The belt may be provide with projections which can catch the leading end of the film and cause it to move to the aforementioned predetermined angular position even if such leading end happens to be located at the wrong side of the guide means when the threading operation begins.

The reel may but need not be accommodated in a magazine; if a magazine is used, the housing of the cinematographic apparatus is formed with a window which registers with a window in the casing of the magazine when the latter is properly mounted on or in the housing, and the belt can be made to extend through such windows and into engagement with the outermost convolution of the supply of film in the magazine.

The novel features which are considered as characteristic of the invention are set forth in particular in the appended claims. The improved film threading device itself, however, both as to its construction and its mode of operation, together with additional features and advantages thereof, will be best understood upon perusal of the following detailed description of a specific embodiment with reference to the accompanying drawing.

BRIEF DESCRIPTION OF THE DRAWING

The single FIG. is a vertical sectional view of a novel magazine for motion picture film and a fragmentary vertical sectional view of a motion picture projector which embodies the invention.

DESCRIPTION OF THE PREFERRED EMBODIMENTS

The drawing illustrates a motion picture projector which comprises a housing 1 having on one of its walls mounting means for releasably supporting a magazine or cassette 2 for a reel 7 carrying a supply 6 of convoluted motion picture film 5. The leading end of the film 5 is shown at 5A. The mounting means for the magazine 2 comprises a ledge 1a on the housing 1 and a shiftable locking member 3 which can engage an upturned rib 2d of the magazine. A second rib 2e is received in a groove defined by the ledge 1a. The means for moving the locking member 3 is not shown in the drawing.

The housing 1 accommodates a film transporting device which includes a driven sprocket wheel 4 extending into a cutout provided in a confining channel including wall members 1A, 1B of the housing 1. These wall members define an elongated path 1D in which the leading end 5A of the film 5 must advance in order to reach the teeth of the sprocket 4. Once the leading end 5A is engaged by such teeth, the film 5 is transported in the customary way through a projection gate so that the images of its frames are projected onto a screen. The leading end 5A can be automatically coupled to a takeup reel or spool which collects the film at the rate at which such film is being paid out by the reel 7 in the magazine 2. The direction in which the reel 7 must be rotated to pay out the film 5 is indicated by arrow B. The aforementioned confining channel including the wall members 1A, 1B has inlet located at one end of the path 1D and flanked by convex surfaces 1b, 1c. The casing of the magazine 2 has a mouth or outlet which is flanked by convex surfaces 2a, 2b. This mouth is in registry with the inlet between the surfaces 1b, 1c so that, one once the leading end 5A assumes a predetermined angular position with reference to the axis of the reel 7, and when the reel is rotated in a sense to pay out the film 5, the leading end 5A is caused to automatically slide along a guide 9 and to pass through the mouth of the magazine, through the inlet of the confining channel, and to advance lengthwise in the path 1D to move into the range of teeth on the sprocket 4. The guide 9 resembles a pawl which is pivotally secured to the casing of the magazine 2, as at 9a, and is biased against the outermost convolution of the supply 6 by a helical spring 8. This guide forms one component of a novel threading device which insures that the leading end 5A of the film 5 finds its way into the path 1D and into the range of teeth on the sprocket 4 regardless of the angular position of the leading end 5A when the latter is concealed in the interior of the magazine 2. In other words, the novel threading device renders it possible to automatically introduce the leading end 5A between the surface surfaces 1b, 1c and to move it lengthwise toward the sprocket 4 regardless of the angular position of the leading end in the chamber 2f defined by the magazine 2. Consequently, and when the film 5 is being rewound onto the reel 7, the operator need not pay any attention and need not monitor the travelling film because it is immaterial in what angular position of the leading end 5A the film comes to a halt when the rewinding operation is completed. Also, the leading end 5A need not project from the mouth of the magazine when the latter is detached from the housing 1.

The aforementioned threading device further comprises a novel drive which preferably derives motion from the sprocket wheel 4 and can rotate the reel 7 in the direction indicated by arrow B by way of the outermost convolution of the supply 6. This drive can be automatically or manually disengaged from the supply 6 when the latter's diameter decreases sufficiently in response to continued withdrawal of film 5 by way of the sprocket 4. When the film transporting mechanism is in operation and it its sprocket 4 advances the film 5 lengthwise in a sense to draw the film 5 off the reel 7, the sprocket 4 rotates in the direction indicated by arrow A. The drive for the supply 6 comprises an endless belt or band 19 which is trained over pulleys or sheaves 17, 18 mounted on shafts 15, 16. The shaft 15 is mounted on an arm 11 which is pivotable on the shaft 12 of the sprocket 4, and the shaft 16 is mounted at the left-hand end of a support or link 14 which is pivotable on the shaft 15 and carries a shaft 14a for the lower end of a second link 10. The latter has an upper end which is mounted for pivotal movement on a pin 13 carried by the lower wall member 1B. The belt 19 has transversely extending projections 19a in the form of ribs. The shaft 15 further carries a third pulley 20 and the shaft 12 carries a fourth pulley 21. The latter drives the pulley 20, and hence the pulley 17, belt 19 and pulley 18, by way of a crossed endless belt or cord 22. The belt 22 is preferably elastic and causes the pulley 18 to rotate in a clockwise direction (arrow C) when the sprocket 4 is caused to rotate in the direction indicated by arrow The arm 11 has an extension 11a which is connected with one end of a helical spring 24 and with one end of a motion transmitting rod 25. The other end of the spring 24 is connected to a post 23 in the housing 1. This spring biases the arm 11 in a clockwise direction and thereby causes the left-hand end turn of the belt 19 to engage the outermost convolution of the supply 6. It will be noted that the housing 1 is provide with a window 1d which registers with a window 2c in the casing of the magazine 2 when the latter is properly attached to the housing. The rod 25 serves as a means for moving the belt 19 away from engagement with the supply 6, for example, when the shaft 7a for the reel 7 is driven in a sense to collect the film 5 on this reel, i.e., when the reel rotates in a counterclockwise direction. The rod 25 can also disengage the belt 19 from the supply 6 as soon as or shortly after the leading end 5A of the film reaches the sprocket 4.

The axes of the shafts 15, 16 are preferably located in a radial plane which also includes the axis of the shaft 7a and the belt 19 preferably consists of rubber or other suitable elastomeric material to further reduce the likelihood of damage to the film 5. It is advisable to employ a drive which rotates the pulley 18 at the peripheral speed of the sprocket 4.

The operation is as follows:

When the user wishes to project the images of successive film frames onto a screen, not shown, the leading end 5A of the film 5 must be moved into the range of teeth on the sprocket 4 so that this sprocket can thereupon transport the film past the gate and in front of the projection lamp. During projection, the shaft 7a and/or the reel 7 is preferably braked by a conventional braking device to insure that the length of film 5 which extends between the supply 6 and the sprocket 4 remains under requisite tension. The manner in which the film 5 is transported by a claw pulldown or the like (mounted in the housing 1 downstream of the sprocket 4) is well known in the art and is into shown in the drawing. When the projection of images is completed, the shaft 7a is connected to the film transporting mechanism which is operated in reverse so as to rotate the reel 7 in a counterclockwise direction whereby the supply 6 of film 5 is restored and the leading end 5A enters the chamber 2f of the magazine 2 to assume an unpredictable angular position with reference to the axis of the shaft 7a and hence with reference to the guide 9. However, and since the cinematographic apparatus is provided with the improved film threading device, the shaft 7a need not be arrested until after the leading end 5A is fully concealed in the interior of the magazine 2.

In order to thereupon thread the leading end 5A into the path 1D, the operator proceeds as follows: The rod 25 is released so that the spring 24 is free to contract and to move the left-hand end turn of the belt 19 against the outermost convolution of the supply 6. The film transporting mechanism is then started so that the sprocket 4 begins to rotate in the direction indicated by arrow A and causes the pulley 18 to rotate in the same direction (arrow C), i.e., the belt 19 causes the supply 6 to rotate in the direction indicated by arrow B. If the leading end 5A of the film 5 happens to overlie the upper side of the guide 9, it is automatically advanced through the mouth (between the surfaces 2a, 2b of the magazine 2) and through the inlet (between the surfaces 1b, 1c) of the path 1D. As the supply 6 continues to rotate in the direction indicated by arrow B, the leading end 5A advances into the range of teeth on the sprocket 4 and is thereupon transported lengthwise in the customary way.

However, if the leading end 5A happens to assume a position 5a which is indicated by broken lines, one of the ribs 19a on the travelling belt 19 engages the tip of the leading end and causes the foremost part of the film 5 to flex, as shown at 5b by broken lines, until the leading end (moving in the direction indicated by arrow C) enters the nip between the belt 19 and the outermost convolution of the supply 6. The latter continues to rotate in the direction indicated by arrow B and automatically moves the leading end to a predetermined optimum angular position for transport into the path 1D, i.e., to the aforementioned position in which the leading end overlies the upper side of the guide 9. The transport of the leading end 5A enter into the path 1D and into the range of teeth on the sprocket 4 is then effected in the previously described manner. If the peripheral speed of the sprocket 4 corresponds to the speed of the belt 19, the belt 19 does not slip with reference to the outermost convolution of the supply 6 even after the leading end 5A is engaged by the teeth of the sprocket 4 and is advanced along the path 1D toward the projection gate. This prevents damage to (particularly scratching of) convoluted film 5 on the reel 7 even if the belt 19 in is not disengaged from the supply 6 a immediately after the leading end 5A reaches the sprocket 4.

The belt 19 is thereupon disengaged from the supply 6 by way of the rod 25 which is moved to the right, as viewed in the drawing, so as to pivot the arm 11 in a counterclockwise direction. The rod 25 may be actuated automatically, for example, by a customary loop former in the housing 1. Alternatively, the rod 25 can be actuated manually by way of a lever, knob, handle or analogous actuating means, not shown.

I claim:

1. In a cinematographic apparatus, particularly in a motion picture projector, a combination comprising a housing; a rotary reel carried by said housing and containing a supply of convoluted film having a leading end; confining means provided in said housing and defining a path wherein the film is conveyed lengthwise in response to unwinding of said supply from said reel, said confining means having an inlet at one end of said path; and threading means for introduction the leading end of said film into said inlet, comprising a drive for rotating said reel by way of said supply of convoluted film in a direction to unwind the film and to thereby place said leading into into a predetermined angular position with reference to the axis of said reel, said drive comprising an element operative to engage the outermost convolution of said supply and to thereby rotate the reel in said direction.

2. A combination as defined in claim 1, wherein said element of said drive is an endless flexible element element.

3. A combination as defined in claim 2, wherein said flexible element consists of elastomeric material.

4. A combination as defined in claim 2, wherein sad said drive means further comprises at least one rotary member, said flexible element being trained over said rotary member in the region where it engages said supply.

5. A combination as defined in claim 2, wherein said drive means further comprises a pair of pulleys having axes located in a common plane with the axis of said reel, a said flexible element being trained over said pulleys.

6. A combination as defined in claim 5, further comprising a support for said pulleys, said support being movable between first and second positions in which said flexible element respectively engages with and is disengaged from said supply.

7. A combination as defined in claim 6, further comprising a magazine accommodating said supply and said reel, a said housing having a first window and said magazine having a second window registering with said first window, said flexible element extending through said windows and into engagement with the supply of film in said magazine in the first position of said support.

8. A combination as defined in claim 7, further comprising mounting means detachably securing said magazine to said housing, said magazine having a mouth in registry with said inlet and said guide means being provide in the interior of said magazine.

9. A combination as defined in claim 6, wherein said support is pivotable about the axis of one of said pulleys.

10. A combination as defined in claim 6, further comprising means for biasing the support to a said first position.

11. In a cinematographic apparatus, particularly in a motion picture projector, a combination comprising a housing; a rotary reel carried by said housing and containing a supply of convoluted l film having a leading end; confining means provided in said housing and defining a path wherein the film is conveyed lengthwise in response to unwinding of said supply from said reel, said confining means having an inlet at one end of said path; film transporting means including a rotary sprocket having teeth extending into said path downstream of said inlet to engage and advance the leading end of said film when such leading end advances beyond said inlet; and threading means for introducing the leading end of said film into said inlet, comprising a drive for rotating said reel by way of said supply of convoluted film in a direction to unwind the film and to thereby place said leading end into a predetermined angular position with reference to the axis of said reel, and guide means for directing said leading end into said inlet in response to further rotation of the reel in said direction, said drive comprising an endless flexible element operative to engage the outermost convolution of said supply an to thereby rotate the reel in said direction, and means deriving motion from said film transporting means and arranged to move said flexible element at the peripheral speed of said sprocket.

12. In a cinematographic apparatus, particularly in a motion picture projector, a combination comprising a housing having a window; a rotary reel carried by said housing and containing a supply of convoluted film having a leading end and being outwardly adjacent to said window; confining means provided in said housing and defining a path for conveying the film lengthwise in response to unwinding of said supply from said reel, said confining means having an inlet at one end of said path; and threading means for introducing the leading end of said film into said inlet, comprising a drive for rotating said reel by way of said supply of convoluted film in a direction to unwind the film and to thereby place said leading end into a predetermined angular position with reference to the axis of said reel, and guide means for directing said leading end into said inlet in response to further rotation of the reel in said direction, said drive comprising a support provided in said housing, a pair of pulleys rotatably mounted on said support and having axes located in a common plane with the axis of said reel, and an endless flexible film-engaging element trained over said pulleys and arranged to by driven in a direction to unwind the film from said reel when such element engages the outermost convolution of said supply, said support being movable substantially radially of said reel to and from an operative position in which the support extends through said window and one of said pulleys maintains the flexible element in engagement with the outermost convolution of said supply.